(12) United States Patent
Arkashevski et al.

(10) Patent No.: US 7,905,427 B2
(45) Date of Patent: Mar. 15, 2011

(54) APPARATUS AND METHOD FOR CLEANING AND DE-ICING

(75) Inventors: Uri Arkashevski, Farmington Hills, MI (US); Joseph Rogozinski, Ramat Gan (IL)

(73) Assignee: M-Heat Investors, LLC, Bettendorf, IA (US)

( * ) Notice: Subject to any disclaimer, the term of this patent is extended or adjusted under 35 U.S.C. 154(b) by 651 days.

(21) Appl. No.: 10/588,165

(22) PCT Filed: Feb. 11, 2005

(86) PCT No.: PCT/IL2005/000179
§ 371 (c)(1), (2), (4) Date: Apr. 2, 2008

(87) PCT Pub. No.: WO2005/076735
PCT Pub. Date: Aug. 25, 2005

(65) Prior Publication Data
US 2008/0203188 A1  Aug. 28, 2008

Related U.S. Application Data

(60) Provisional application No. 60/544,438, filed on Feb. 12, 2004, provisional application No. 60/642,233, filed on Jan. 6, 2005.

(51) Int. Cl.
*B05B 1/10* (2006.01)
(52) U.S. Cl. .................................................. 239/284.1
(58) Field of Classification Search ............... 239/284.1, 239/284.2, 128, 130, 133–135, 139
See application file for complete search history.

(56) References Cited

U.S. PATENT DOCUMENTS

| | | | |
|---|---|---|---|
| 653,629 | A | 7/1900 | Schneider |
| 1,523,156 | A | 1/1925 | Adams |
| 1,636,190 | A | 7/1927 | Mahoney |
| 2,607,944 | A | 8/1952 | Shaw et al. |
| 3,202,447 | A | 8/1965 | Whaley et al. |
| 3,203,447 | A | 8/1965 | Bremner et al. |
| 3,319,891 | A | 5/1967 | Campbell |
| 3,332,045 | A | 7/1967 | Rodaway |
| 3,427,675 | A | 2/1969 | Tibbet |
| 3,446,942 | A | 5/1969 | Letsinger et al. |

(Continued)

FOREIGN PATENT DOCUMENTS

DE  33 24 634  1/1985

(Continued)

OTHER PUBLICATIONS

Patent Abstracts of JP 7223510 dated Aug. 1995.

(Continued)

*Primary Examiner* — Davis Hwu
(74) *Attorney, Agent, or Firm* — Weingarten, Schurgin, Gagnebin & Lebovici LLP

(57) ABSTRACT

A windshield heated liquid spray assembly including a liquid heating assembly and a heated liquid spray assembly operative to spray the heated liquid onto a windshield, the liquid heating assembly including a liquid heating chamber, at least one heating element disposed in the liquid heating chamber and at least one heat dissipator in heat conduction contact with the at least one heating element, the at least one heat dissipator at least partially defining at least one liquid flow channel and being operative to transfer heat from the at least one heating element to the liquid flowing through the at least one liquid flow channel.

6 Claims, 12 Drawing Sheets

U.S. PATENT DOCUMENTS

| | | |
|---|---|---|
| 3,475,588 A | 10/1969 | McMaster |
| 3,524,044 A | 8/1970 | Liardi |
| 3,537,900 A | 11/1970 | Halbert |
| 3,632,042 A | 1/1972 | Goulish et al. |
| 3,643,193 A | 2/1972 | Prouty |
| 3,711,679 A | 1/1973 | Moschkau et al. |
| 3,716,886 A | 2/1973 | Klomp |
| 3,747,500 A | 7/1973 | Redd |
| 3,888,412 A | 6/1975 | Lindo |
| 3,977,436 A | 8/1976 | Larner |
| 3,979,068 A | 9/1976 | Applebaum |
| 4,088,269 A | 5/1978 | Schlick |
| 4,090,668 A | 5/1978 | Kochenour |
| 4,106,508 A | 8/1978 | Berlin |
| 4,159,026 A | 6/1979 | Williamson |
| 4,212,425 A | 7/1980 | Schlick |
| 4,253,493 A | 3/1981 | English |
| 4,275,477 A | 6/1981 | Kato |
| 4,295,111 A | 10/1981 | Wang |
| 4,306,589 A | 12/1981 | Harned et al. |
| 4,403,756 A | 9/1983 | Berlin et al. |
| 4,489,863 A | 12/1984 | Horchos et al. |
| 4,508,957 A | 4/1985 | Rocchitelli et al. |
| 4,524,797 A | 6/1985 | Lungu |
| 4,534,539 A | 8/1985 | Dettmann |
| 4,561,632 A | 12/1985 | Hugler |
| 4,574,841 A | 3/1986 | Hugler |
| 4,616,780 A | 10/1986 | Abbott |
| 4,638,525 A | 1/1987 | Sugita et al. |
| 4,690,371 A | 9/1987 | Bosley et al. |
| 4,815,662 A | 3/1989 | Hunter |
| 4,832,262 A | 5/1989 | Robertson |
| 4,834,289 A | 5/1989 | Hunter |
| 4,877,186 A | 10/1989 | Scholl |
| 4,922,570 A | 5/1990 | Hirohama et al. |
| 4,946,009 A | 8/1990 | Knutson |
| 5,012,977 A | 5/1991 | Karklins et al. |
| 5,034,714 A | 7/1991 | Bratkowski et al. |
| 5,118,040 A | 6/1992 | Abe |
| 5,134,266 A | 7/1992 | Peppard |
| 5,141,157 A | 8/1992 | Han et al. |
| 5,141,160 A | 8/1992 | Waters |
| 5,173,586 A | 12/1992 | Gold |
| 5,203,049 A | 4/1993 | Nogawa |
| 5,254,083 A | 10/1993 | Gentelia et al. |
| 5,271,120 A | 12/1993 | Eustache et al. |
| 5,280,806 A | 1/1994 | Glazebrook |
| 5,318,071 A | 6/1994 | Gaiardo |
| 5,334,819 A | 8/1994 | Lin |
| 5,345,968 A | 9/1994 | Day |
| 5,351,934 A | 10/1994 | Jensen et al. |
| 5,354,965 A | 10/1994 | Lee |
| 5,383,247 A | 1/1995 | Nickel |
| 5,423,486 A | 6/1995 | Hunter |
| 5,467,522 A | 11/1995 | Gold |
| 5,509,606 A | 4/1996 | Breithaupt et al. |
| 5,561,882 A | 10/1996 | Eustache et al. |
| 5,636,407 A | 6/1997 | Len |
| 5,650,080 A | 7/1997 | Koneke |
| 5,673,360 A | 9/1997 | Scripps |
| 5,711,486 A | 1/1998 | Clark et al. |
| 5,711,487 A | 1/1998 | Hommelet |
| 5,727,118 A | 3/1998 | Chopard et al. |
| 5,727,769 A | 3/1998 | Suzuki |
| 5,762,278 A | 6/1998 | Yamaguchi et al. |
| 5,784,751 A | 7/1998 | Tippets |
| 5,823,439 A | 10/1998 | Hunter et al. |
| 5,881,428 A | 3/1999 | Simmons |
| 5,903,953 A | 5/1999 | Dimur et al. |
| 5,927,608 A | 7/1999 | Scorsiroli |
| 5,944,910 A | 8/1999 | Fujii |
| 5,947,348 A | 9/1999 | Briski |
| 5,957,384 A | 9/1999 | Lansinger |
| 5,965,950 A | 10/1999 | Park |
| 5,979,796 A | 11/1999 | Ponziani et al. |
| 5,988,523 A | 11/1999 | Scott |
| 5,988,529 A | 11/1999 | Luhring |
| 6,008,474 A | 12/1999 | Dumas |
| 6,024,803 A | 2/2000 | Buchanan, Jr. et al. |
| 6,029,908 A | 2/2000 | Petzold |
| 6,032,324 A | 3/2000 | Lansinger |
| 6,050,503 A | 4/2000 | Suhring et al. |
| 6,082,632 A | 7/2000 | Clark et al. |
| 6,133,546 A | 10/2000 | Bains |
| 6,155,493 A | 12/2000 | Kearby et al. |
| 6,164,564 A | 12/2000 | Franco et al. |
| 6,199,587 B1 | 3/2001 | Shlomi et al. |
| 6,220,524 B1 | 4/2001 | Tores et al. |
| 6,223,951 B1 | 5/2001 | Siegel et al. |
| 6,236,019 B1 | 5/2001 | Piccione et al. |
| 6,237,861 B1 | 5/2001 | Northrop et al. |
| 6,257,500 B1 | 7/2001 | Petzold et al. |
| 6,265,829 B1 | 7/2001 | Perdec |
| 6,281,649 B1 | 8/2001 | Ouellette et al. |
| 6,286,174 B1 | 9/2001 | Zimmer |
| 6,330,497 B1 | 12/2001 | Obradovich et al. |
| 6,463,621 B1 | 10/2002 | Zimmer et al. |
| 6,615,438 B1 | 9/2003 | Franco et al. |
| 6,669,109 B2 | 12/2003 | Ivanov et al. |
| 6,902,118 B2 * | 6/2005 | Shank et al. .................. 239/13 |
| 2002/0026999 A1 | 3/2002 | Evans et al. |
| 2002/0137455 A1 | 9/2002 | Rogozinski et al. |
| 2004/0045587 A1 | 3/2004 | Franco et al. |
| 2004/0112981 A1 | 6/2004 | Ivanov et al. |
| 2005/0177969 A1 | 8/2005 | Franco et al. |

FOREIGN PATENT DOCUMENTS

| | | |
|---|---|---|
| DE | 36 34 404 | 11/1987 |
| EP | 0 104 673 | 4/1984 |
| EP | 0 456 934 | 11/1991 |
| EP | 0745523 | 12/1996 |
| EP | 1022936 | 6/2004 |
| GB | 370 687 | 4/1932 |
| GB | 1451666 | 10/1976 |
| JP | 59 011949 | 5/1984 |
| JP | 02 053656 | 5/1990 |
| JP | 2-234866 | 9/1990 |
| JP | 7223510 | 8/1995 |
| JP | 83-12824 | 11/1996 |
| JP | 11-211821 | 8/1999 |
| JP | 2000-177538 | 10/2000 |
| WO | WO 96/11350 | 4/1996 |
| WO | 97/46431 | 12/1997 |
| WO | WO 97/46431 | 12/1997 |
| WO | WO 98/58826 | 12/1998 |
| WO | WO 00/15479 | 3/2000 |
| WO | WO 00/48878 | 8/2000 |
| WO | WO 02/092237 | 11/2002 |

OTHER PUBLICATIONS

Patent Abstracts of Japan of JP 11-211821 dated Aug. 6, 1999.

* cited by examiner

US 7,905,427 B2

APPARATUS AND METHOD FOR CLEANING AND DE-ICING

REFERENCE TO RELATED APPLICATIONS

Reference is made to U.S. Provisional Patent Application Ser. No. 60/544,438, filed Feb. 12, 2004 and entitled "Apparatus and Method for Low Temperature De-Icing," and U.S. Provisional Patent Application Ser. No. 60/642,233, filed Jan. 6, 2005 and entitled "Apparatus and Method for Low Temperature De-Icing" the disclosures of which are hereby incorporated by reference and priority of which are hereby claimed pursuant to 37 CFR 1.78(a) (4) and (5)(i).

Reference is also made to applicant's copending PCT Application Ser. No. PCT/IL03/00854 filed Oct. 21, 2003, the disclosure of which is hereby incorporated by reference.

BACKGROUND OF THE INVENTION

The following publications are believed to represent the current state of the art:

U.S. Pat. Nos. 6,199,587; 6,164,587; 5,988,529; 5,947,348; 5,927,608; 5,509,606; 5,383,247; 5,354,965; 5,254,083; 5,118,040; 5,012,977; 4,106,508; 4,090,668 and 3,979,068.

Published PCT Applications: WO 02/092237, WO 00/27540, WO 98/58826.

SUMMARY OF THE INVENTION

The present invention seeks to provide improved apparatus and method for cleaning or de-icing vehicle elements.

There is thus provided in accordance with a preferred embodiment of the present invention a windshield heated liquid spray assembly including a liquid heating assembly and a heated liquid spray assembly operative to spray heated liquid onto a windshield, the liquid heating assembly including a liquid heating chamber, at least one heating element disposed in the liquid heating chamber and at least one heat dissipator in heat conduction contact with the at least one heating element, the at least one heat dissipator at least partially defining at least one liquid flow channel and being operative to transfer heat from the at least one heating element to the liquid flowing through the at least one liquid flow channel.

There is also provided in accordance with another preferred embodiment of the present invention a windshield heated liquid spray assembly including a liquid heating assembly and a heated liquid spray assembly operative to spray heated liquid onto a windshield, the liquid heating assembly including a liquid heating chamber, at least one heating element disposed in the liquid heating chamber and an electrical power supply connection to the at least one heating element, the electrical power supply connection including a meltable conductor portion in heat conductive contact with the liquid heating chamber and being operative to melt, and thus interrupt supply of electrical power to the at least one heating element in response to heating of liquid in the liquid heating chamber above a predetermined temperature.

There is further provided in accordance with yet another preferred embodiment of the present invention a windshield heated liquid spray assembly including a liquid heating assembly, a liquid temperature sensor operative to sense a temperature of liquid heated by the liquid heating assembly, a heated liquid spray assembly operative to spray the heated liquid onto a windshield and a controller operative to control operation of the spray assembly in accordance with the temperature sensed by the liquid temperature sensor, the controller providing at least one first spray instance beginning when the liquid temperature is at a first temperature and terminating when the liquid temperature is at a second temperature, below the first temperature, and at least one second spray instance terminating when the liquid temperature is at a third temperature, below the second temperature.

Preferably, the windshield heated liquid spray assembly also includes a temperature sensor operative to sense an ambient temperature outside of the liquid heating assembly. Additionally, the third temperature is determined by the controller based on the ambient temperature.

Additionally, the controller is operative to terminate the at least one first spray instance if the second temperature in not reached within a predetermined time. Additionally or alternatively, the controller is operative to terminate the at least one second spray instance if the third temperature in not reached within a predetermined time.

Preferably, the at least one second spray instance begins when the liquid temperature is at the first temperature.

Additionally, the liquid heating assembly also includes an electrical power supply connection to the at least one heating element, the electrical power supply connection including a meltable conductor portion in heat conductive contact with the liquid heating chamber and being operative to melt, and thus interrupt supply of electrical power to the at least one heating element in response to heating of liquid in the liquid heating chamber above a predetermined temperature.

Preferably, the windshield heated liquid spray assembly also includes at least one heat dissipator in heat conduction contact with the at least one heating element, the at least one heat dissipator at least partially defining at least one liquid flow channel and being operative to transfer heat from the at least one heating element to the liquid flowing through the at least one liquid flow channel.

Preferably, the windshield heated liquid spray assembly also includes a liquid temperature sensor operative to sense a temperature of liquid heated by the liquid heating assembly. Preferably, the at least one heat dissipator is configured and operative to enhance homogeneity of heating of the liquid in the liquid heating chamber, whereby the temperature sensed by the liquid temperature sensor is generally representative of the temperature of the liquid within the liquid heating chamber.

Additionally or alternatively, the at least one heat dissipator is configured to be non-uniform along at least one dimension of the liquid heating chamber. Preferably, the at least one heat dissipator is configured to extend along a longitudinal axis, which is intended to be aligned vertically and is non-uniform along the longitudinal axis, thereby to enhance homogeneity of heating of the liquid therealong.

Preferably, the at least one heat dissipator includes at least one aperture communicating with the at least one liquid flow channel.

Preferably, the at least one heat dissipator is located within the liquid heating chamber to define at least one fluid flow gap. Additionally, the at least one fluid flow gap causes fluid flow within the liquid heating chamber in multiple directions. Additionally or alternatively, the at least one heat dissipator is configured to extend along a longitudinal axis and wherein the fluid flow in multiple directions includes fluid flow in opposite longitudinal directions along the longitudinal axis. Preferably, the fluid flow in multiple directions provides enhanced homogeneity of temperatures of the liquid in the liquid heating chamber.

There is even further provided in accordance with still another preferred embodiment of the present invention a windshield heated liquid spray assembly including a liquid heating assembly and a heated liquid spray assembly operative to spray heated liquid onto a windshield, the liquid heating assembly including a liquid heating chamber, at least one heating element disposed in the liquid heating chamber and a liquid supply assembly coupled to the liquid heating chamber and including a valve operative to allow liquid flow into the liquid heating chamber and to impede backflow from the liquid heating chamber and at least one bypass conduit, user selectably operative to allow the backflow to bypass the valve.

There is still further provided in accordance with another preferred embodiment of the present invention a method for spraying heated liquid onto a windshield including providing a liquid heating assembly including a liquid heating chamber, at least one heating element disposed in the liquid heating chamber and at least one heat dissipator in heat conduction contact with the at least one heating element, the at least one heat dissipator at least partially defining at least one liquid flow channel, heating the at least one heating element, transferring heat from the at least one heating element to liquid flowing through the at least one liquid flow channel and spraying the liquid heated by the liquid heating assembly onto a windshield.

These is yet further provided in accordance with yet another preferred embodiment of the present invention a method for spraying heated liquid onto a windshield including providing a liquid heating assembly including a liquid temperature sensor, heating a liquid in the liquid heating assembly until a first spray cycle start temperature is sensed by the liquid temperature sensor, beginning at least one first spray instance when the first spray cycle start temperature is sensed by the liquid temperature sensor, terminating the first spray instance when a first spray cycle end temperature is sensed by the liquid temperature sensor; the first spray cycle end temperature being below the first spray cycle start temperature, subsequently beginning at least one second spray instance when a second spray cycle start temperature is sensed by the liquid temperature sensor and terminating the second spray instance when a second spray cycle end temperature is sensed by the liquid temperature sensor, the second spray cycle end temperature being below the first spray cycle end temperature.

BRIEF DESCRIPTION OF THE DRAWINGS

The present invention will be understood and appreciated more fully from the following detailed description, taken in conjunction with the drawings in which.

DETAILED DESCRIPTION OF THE PREFERRED EMBODIMENTS

Figure 1:
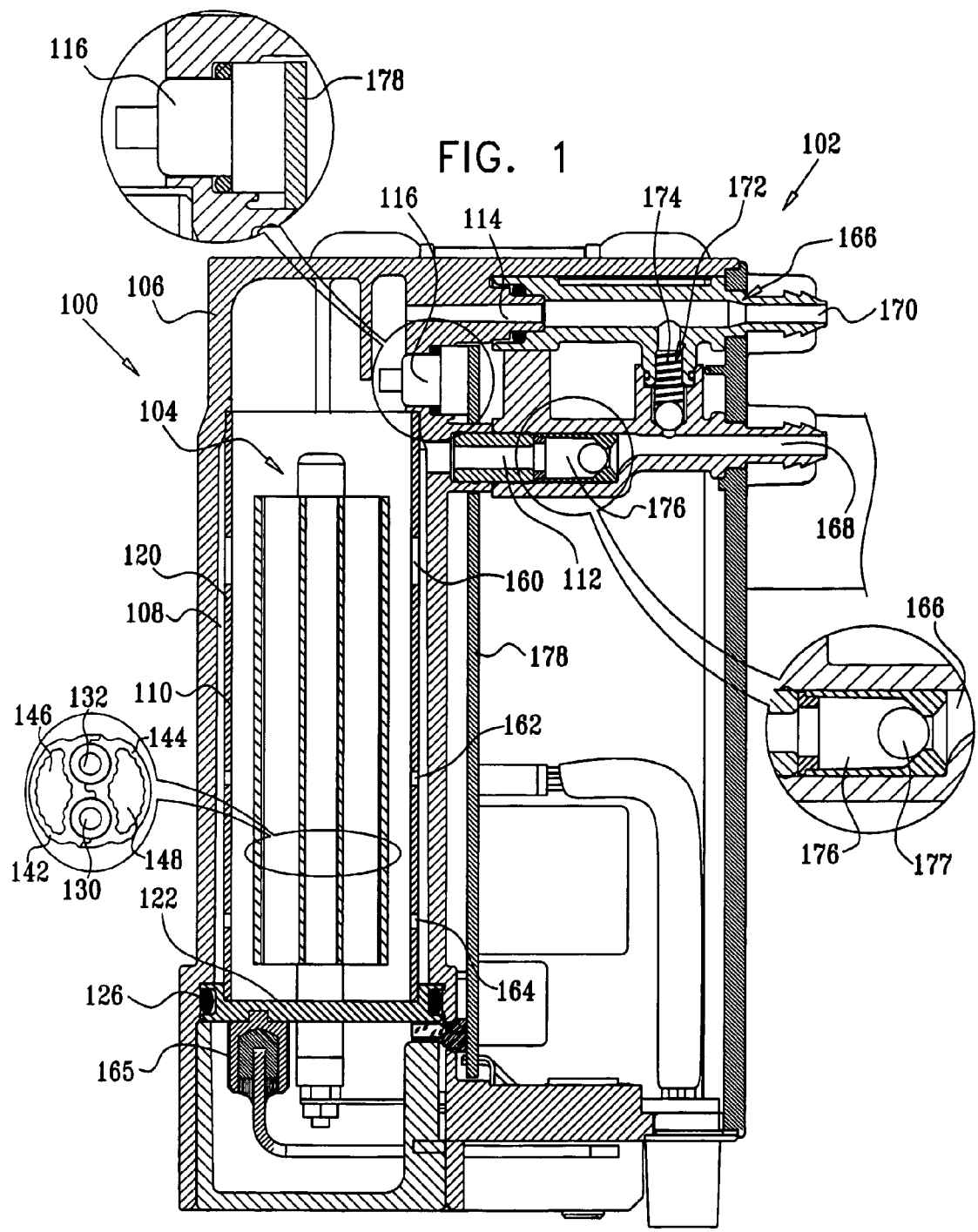
FIG. 1 is a simplified sectional illustration of a heated liquid discharge system suitable for use in a motor vehicle, constructed and operative in accordance with a preferred embodiment of the present invention.

Reference is now made to FIG. 1, which is a simplified illustration of a heated liquid discharge system suitable for use in a motor vehicle, constructed and operative in accordance with a preferred embodiment of the present invention. As seen in FIG. 1, a heated liquid discharge system 100 preferably includes a main assembly 102, which provides liquid heating and includes electrical and liquid flow control functionalities. Main assembly 102 is preferably electrically connected via electrical cables (not shown) to a vehicle battery (not shown).

Main assembly 102 comprises a liquid heating chamber 104 communicating with a liquid inflow conduit (not shown) and a liquid outflow conduit (not shown). The liquid inflow conduit is operative to supply liquid, such as water, antifreeze or windshield cleaning liquid, from a vehicle liquid reservoir (not shown), having an associated vehicle pump (not shown), to the liquid heating chamber 104. The liquid outflow conduit is operative to supply liquid to one or more sprayers (not shown), which may be located at one or more of the following vehicle locations: front vehicle windshield, back vehicle windshield, side vehicle windows in general and especially in locations providing viewing access to vehicle exterior mirrors, vehicle headlights, vehicle rear lights and vehicle exterior mirrors.

It is appreciated that the term "vehicle" as used in the context of the present patent application and in the claims can refer to any type of wheeled vehicle having windows, such as an automobile or a truck, as well as a boat or an airplane.

Main assembly 102 preferably includes a housing 106 defining a generally circular cylindrical liquid heating chamber accommodating volume 108, in which is located liquid heating chamber 104, in a major portion of which is disposed a liquid heating assembly 110. Housing 106 also preferably defines a liquid inlet channel 112, a liquid outlet channel 114 and an aperture for housing a heated liquid temperature sensor 116, all communicating with liquid heating chamber accommodating volume 108.

Figure 2:
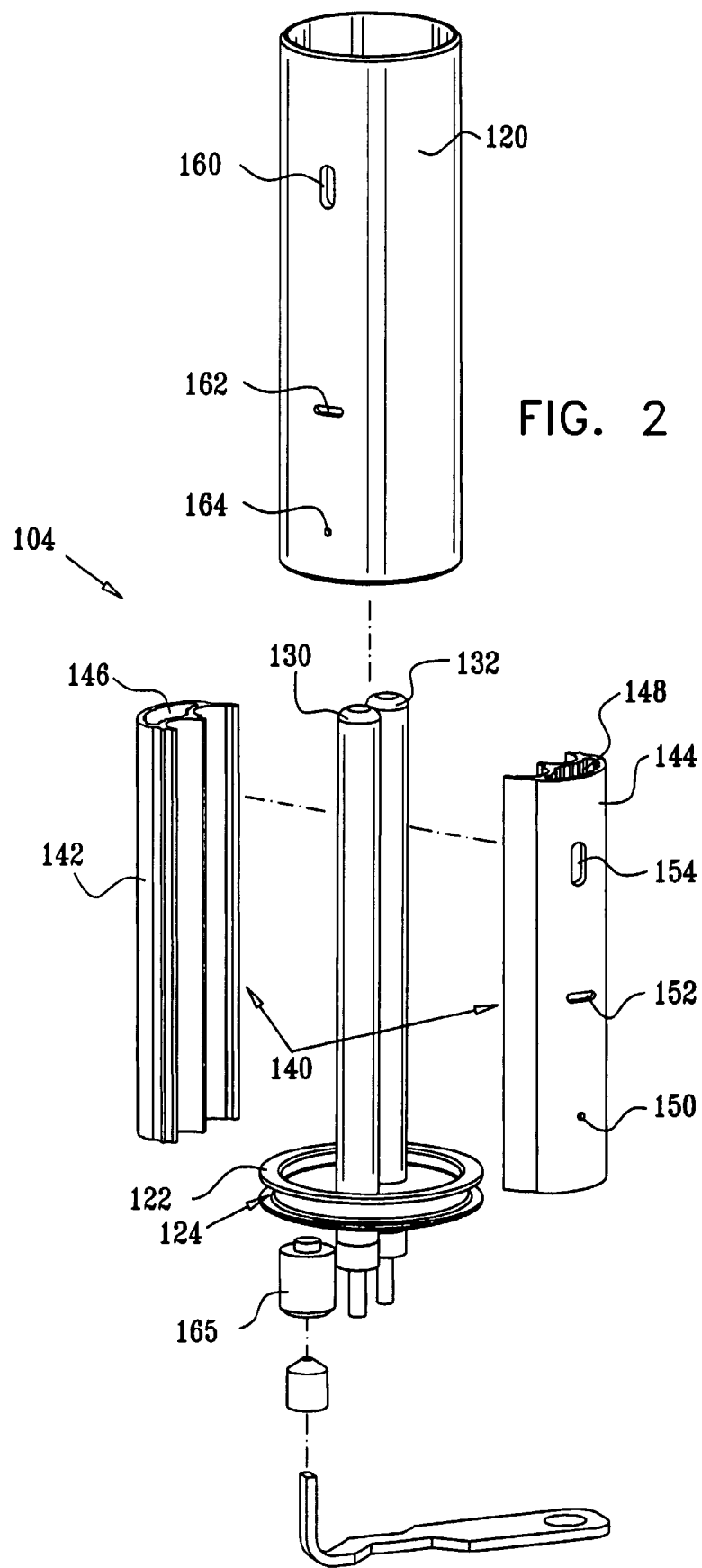
FIG. 2 is a simplified exploded view illustration of the heating chamber of the system of FIG. 1.
Figure 3A:
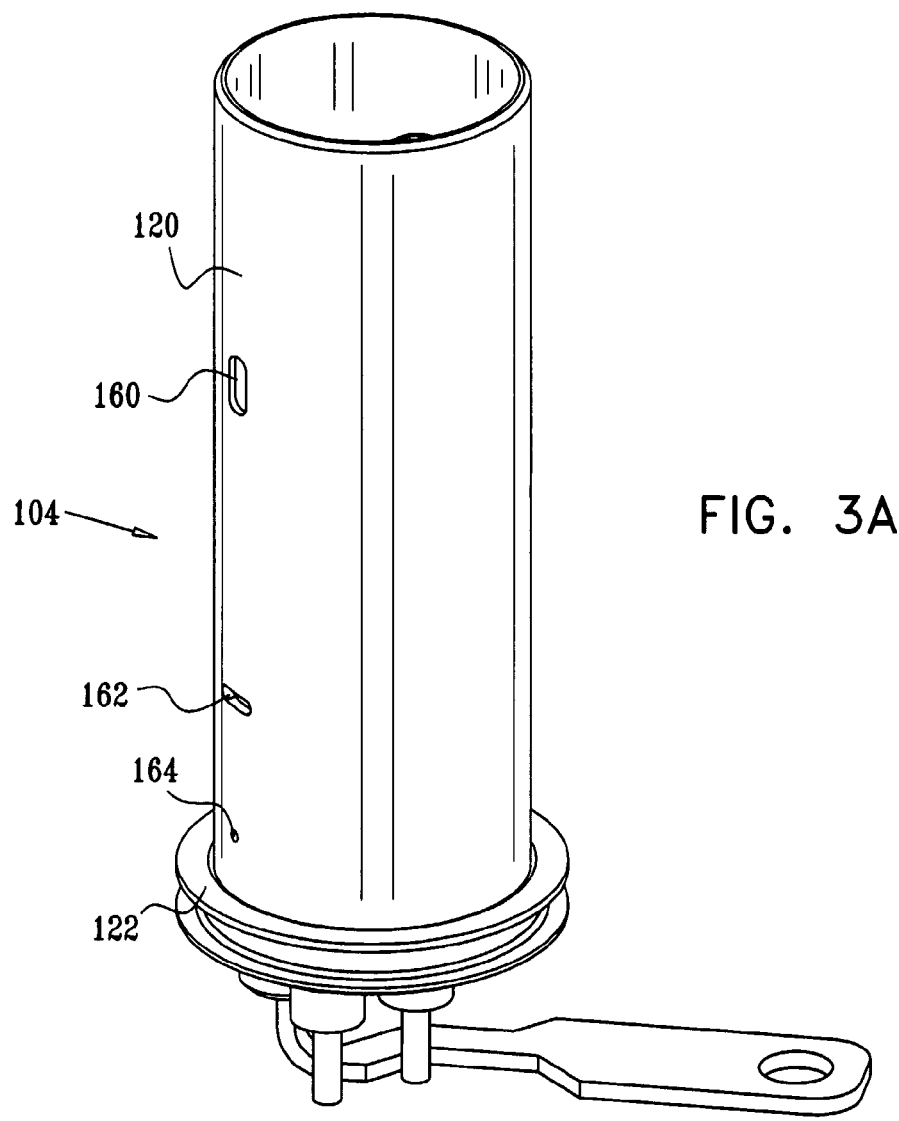
FIGS. 3A and 3B are a simplified pictorial illustration and a simplified top view illustration of the heating chamber of FIG. 2.
Figure 3B:
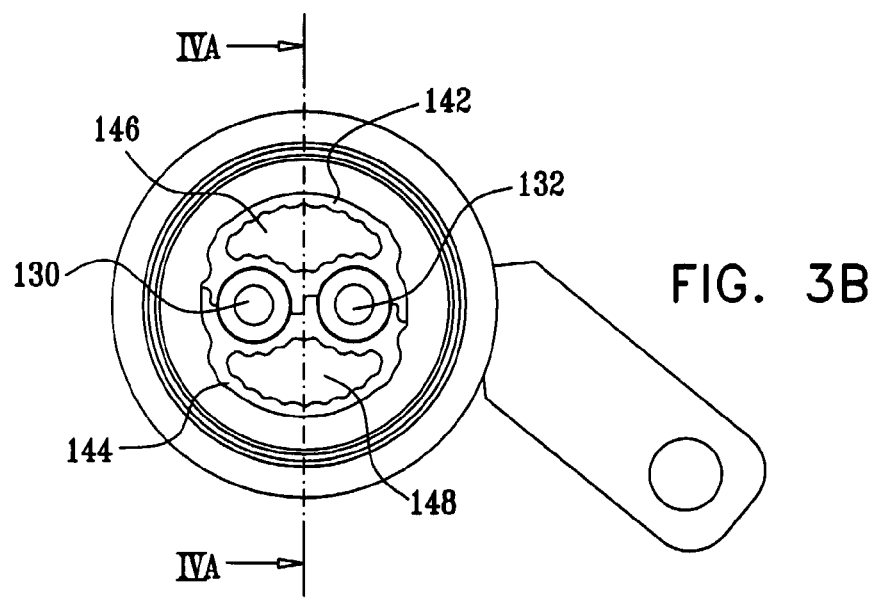

Reference is now made additionally to FIGS. 2, 3A and 3B, which illustrate details of the structure of liquid heating assembly 110. As seen in FIG. 2, liquid heating assembly 110 preferably comprises a circular cylindrical outer sleeve 120 which defines liquid heating chamber 104, and a base 122, which defines a sealing ring retaining socket 124, arranged to retain an insulating liquid sealing ring 126 (FIG. 1). A plurality of heating elements, preferably two in number, designated by reference numerals 130 and 132, are located within sleeve 120.

In accordance with a preferred embodiment of the present invention, a heat dissipator assembly 140, including at least one heat dissipator, preferably encloses heating elements 130 and 132. Heat dissipator assembly 140 includes heat dissipators 142 and 144, defining respective liquid flow channels 146 and 148, which are thermally and mechanically connected to heating elements 130 and 132, preferably by soldering or any other suitable connection. Heat dissipator assembly 140 provides efficient heat transfer between heating elements 130 and 132 and liquid flowing through liquid flow channels 146 and 148. Heat dissipators 142 and 144 preferably include multiple side apertures, designated by reference numerals 150, 152 and 154, to facilitate passage of liquid therethrough.

It is appreciated that liquid flow channels 146 and 148 provide efficient heating of the liquid contained therein.

As seen further in FIG. 2, outer sleeve 120 preferably includes multiple apertures, designated 160, 162 and 164, to enable liquid flow therethrough. It is appreciated that apertures 150, 152 and 154, as well as apertures 160, 162 and 164 may be provided in any suitable quantity, location and shape to facilitate passage of liquid through outer sleeve 120 and heat dissipator assembly 140. In a preferred embodiment of the present invention, a pair of each of apertures 160, 162 and 164 are provided on opposite sides of a vertical axis thereof.

It is appreciated that apertures 150, 152 and 154, as well as apertures 160, 162 and 164 are located and sized to provide increased homogeneity in the temperature of fluid located within liquid heating chamber 104.

Liquid heating assembly 110 preferably also includes an electrical power supply connection 165 to base 122.

As seen further in FIG. 1, heated liquid discharge system 100 also includes a liquid connector assembly 166 including a liquid inlet pathway portion 168 and a liquid outlet pathway portion 170. Liquid connector assembly 166 preferably comprises an injection molded element which also defines a differential pressure bypass pathway portion 172, which is controlled by a spring loaded one-way valve 174 and which permits liquid flow from liquid inlet pathway portion 168 to liquid outlet pathway portion 170 when the pressure differential thereacross reaches a predetermined threshold, typically 0.3-0.5 bar, which indicates the existence of a blockage in the liquid path through liquid heating chamber 104.

A valve 176 is disposed in liquid inlet pathway portion 168 upstream of liquid heating chamber 104. Value 176 preferably includes a partial sealing element, such as a ball 177, which allows supply of liquid under pressure to the liquid heating chamber accommodating volume 108 but restricts backflow therethrough to a relatively slow rate. Alternatively, ball 177 of valve 176 may be obviated to allow backflow at a relatively faster rate than the backflow otherwise provided by valve 176 with ball 177.

Liquid from the vehicle reservoir is supplied to liquid heating chamber accommodating volume 108 via liquid inlet pathway portion 168 and liquid inlet channel 112 and preferably enters liquid heating chamber 104, defined by sleeve 120, via apertures 160, 162 and 164 formed in sleeve 120.

The liquid is heated in liquid heating chamber 104 and the temperature of the liquid or the air overlying the liquid, depending on the liquid level, is sensed by temperature sensor 116, preferably a sensor commercially available from EPCOS AG. Corporate Communications of Munich, Germany, identified by Catalog No. G560/50K/F2. Temperature sensor 116 preferably is mounted onto a printed circuit board 178 which is mounted within housing 106 and located outside of liquid heating chamber accommodating volume 108.

Also mounted on printed circuit board 178 is control circuitry for operation of the main assembly 102 which is connected inter alia to temperature sensor 116 and the vehicle battery.

Figure 4A:
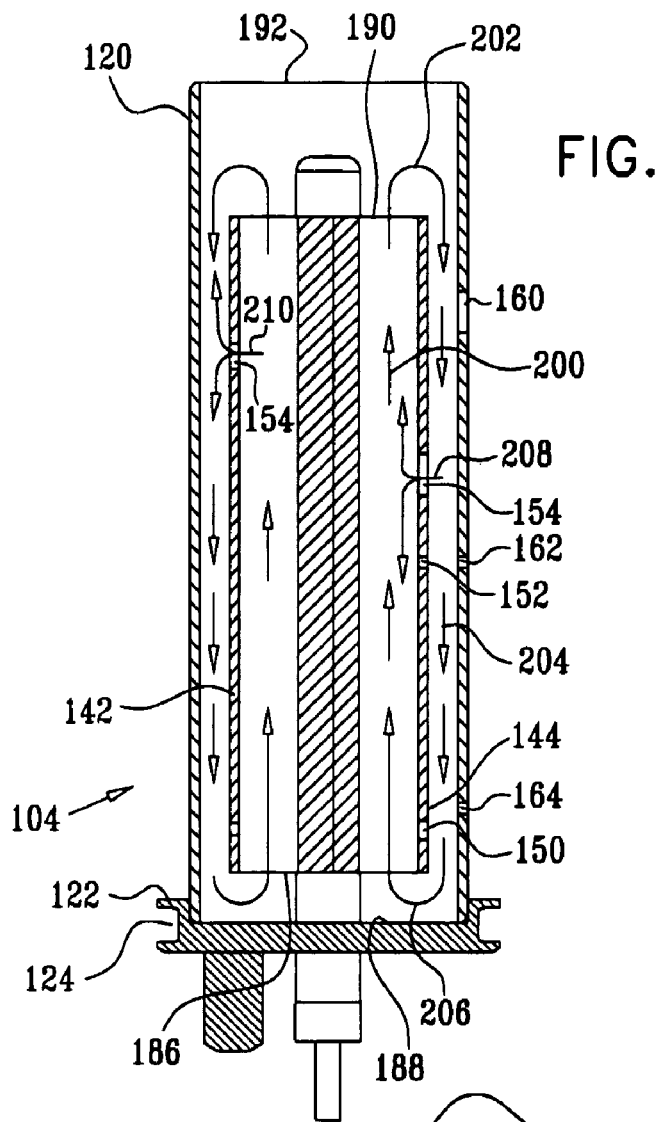
FIG. 4A is a simplified sectional illustration of the heating chamber of FIGS. 2-3B, taken along lines IVA-IVA in FIG. 3B, illustrating fluid flow therewithin.
Figure 4B:
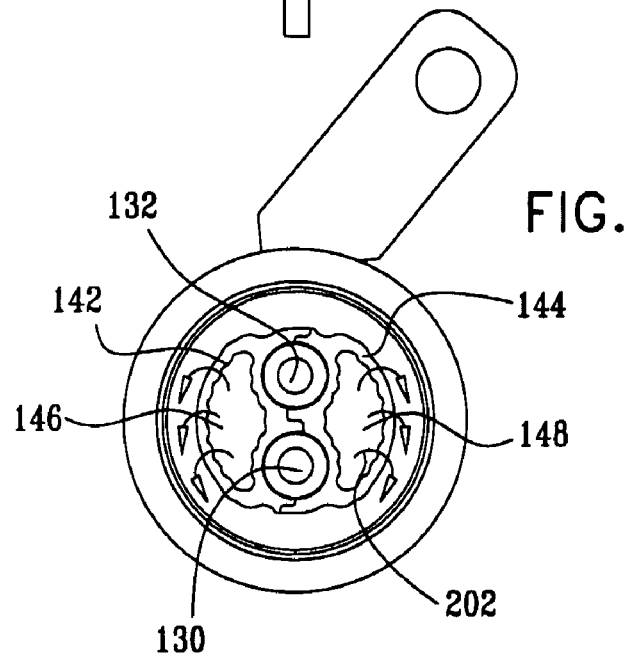
FIG. 4B is a simplified top view of the liquid heating chamber of FIGS. 2-3B, illustrating fluid flow therewithin.

Reference is now made to FIGS. 4A and 4B, which are simplified illustrations of liquid flow within liquid heating chamber 104.

In accordance with a preferred embodiment of the present invention, heat dissipators 142 and 144 are positioned relative to heating elements 130 and 132 to define liquid flow channels 146 and 148. The heating elements 130 and 132 are preferably connected to the base 122, preferably by soldering.

Heat dissipators 142 and 144 are positioned within outer sleeve 120 to define a fluid flow gap between a lower surface 186 of the heat dissipator assembly 140 and an upper surface 188 of base 122. Additionally, walls of cylindrical outer sleeve 120 preferably extend beyond the top 190 of heat dissipators 142 and 144, defining a fluid flow gap between the top 190 of heat dissipator assembly 140 and an upper surface 192 of the cylindrical outer sleeve 120.

The fluid flow gaps described hereinabove, between lower surface 186 and upper surface 188, and between top 190 and upper surface 192, permit fluid flow in multiple directions within liquid heating chamber 104 as described hereinbelow.

As seen in FIG. 4A, heated fluid flows generally upwardly within heat dissipators 142 and 144, as shown by arrow 200, between lower surface 186 of heat dissipator assembly 140 and top 190 of heat dissipator assembly 140. Upon reaching the area of liquid heating chamber 104 above heat dissipator assembly 140, some of the fluid flows outside of the area above heat dissipator assembly 140 and is drawn into a downward flow, as shown by arrow 202. Unheated fluid entering liquid heating chamber 104 through apertures 160, 162 and 164 flows generally downwardly within liquid heating chamber 104 outside of heat dissipator assembly 140, as shown by arrow 204. Upon reaching the area of liquid heating chamber 104 below heat dissipator assembly 140, some of the fluid flows inside of the area below heat dissipator assembly 140 and is drawn into an upward flow, as shown by arrow 206.

The fluid flows indicated by arrows 200, 202, 204 and 206 in multiple directions are generated by differences in fluid temperature within liquid heating chamber 104. Preferably, over time, the fluid flows indicated by arrows 200, 202, 204 and 206 produce increased uniformity of the temperature of the liquid in the liquid heating chamber 104. The arrangement of heat dissipator assembly 140 within liquid heating chamber 104, providing fluid flows in multiple directions, provides increased temperature uniformity and heating efficiency when compared to prior art heating units.

As seen further in FIG. 4A, liquid also flows through apertures 150, 152 and 154 providing additional fluid flows shown by arrows 208 and 210. It is appreciated that liquid entering heat dissipators 142 and 144 through apertures 150, 152 and 154, as shown by fluid flow indicated by arrow 208, is drawn partially into an upward flow, by the existing flow within liquid flow channels 146 and 148, and partially into a downward flow, when it is at a lower temperature than liquid within liquid flow channels 146 and 148. Similarly, liquid exiting heat dissipators 142 and 144 through apertures 150, 152 and 154, as shown by fluid flow indicated by arrow 210, is drawn partially into a downward flow, by the existing flow within liquid heating chamber 104 outside of liquid flow channels 146 and 148, and partially into an upward flow, when it is at a higher temperature than liquid within liquid heating chamber 104 outside of liquid flow channels 146 and 148.

As discussed hereinabove, the multiple fluid flows preferably provide for a generally homogenous temperature distribution within liquid heating chamber 104 and therefore measurement of the temperature of the liquid at the exit opening provides a generally representative indication of the average temperature of the liquid within the heating chamber 104. Managing the temperature and flow controls of heated liquid discharge system 100, done in accordance with measuring the temperature of the liquid at this point, provides enhanced homogeneity of the temperature of the heated liquid in liquid heating chamber 104.

Specifically, heated liquid discharge system 100, by providing enhanced homogeneity of liquid temperatures found therein, provides for an increased volume of fluid being sprayed during a spraying cycle whose duration is governed by the liquid temperature sensed by temperature sensor 116. Accordingly, by providing enhanced homogeneity of liquid temperatures found therein, heated liquid discharge system 100 provides an increased amount of heat energy transferred to the windshield by the heated liquid during a given spray cycle.

It is appreciated that this feature of providing generally homogenous temperature distribution within liquid heating chamber 104 enables the heating system of the present invention to enhance heating of the windshield while conforming to the requirements and specifications of vehicle manufacturers, that define an upper limit to the liquid temperature allowed for heated spraying.

Figure 5A:
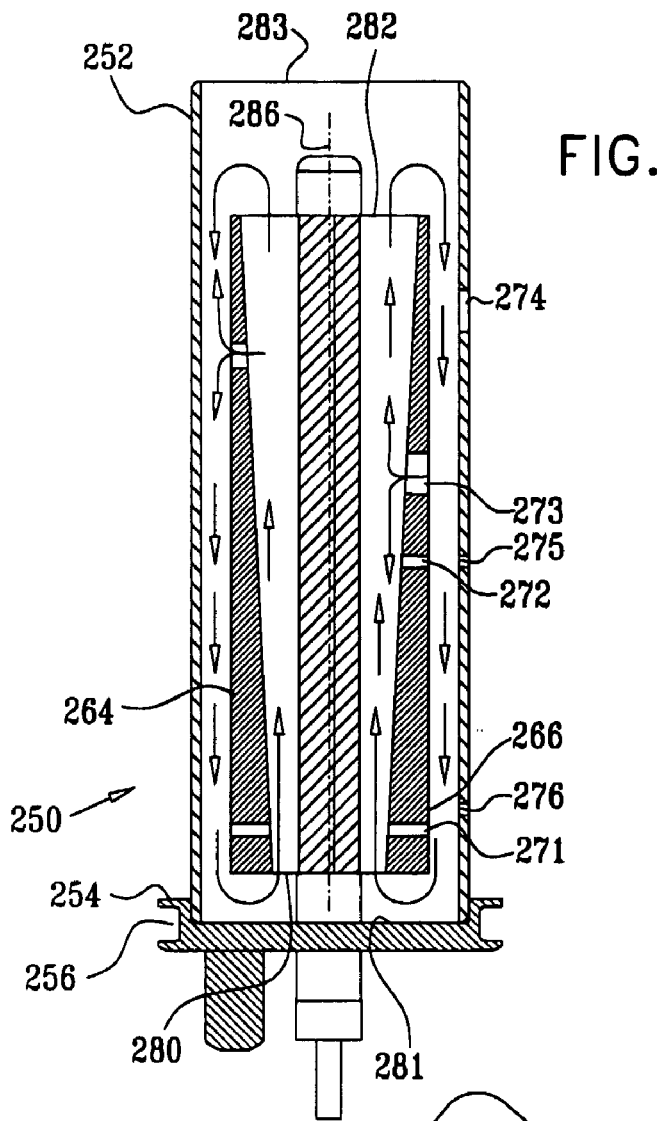
FIGS. 5A and 5B are, respectively, simplified sectional and top view illustrations of a liquid heating assembly suitable for use in the heated liquid discharge system of FIG. 1 in accordance with another preferred embodiment of the present invention.
Figure 5B:
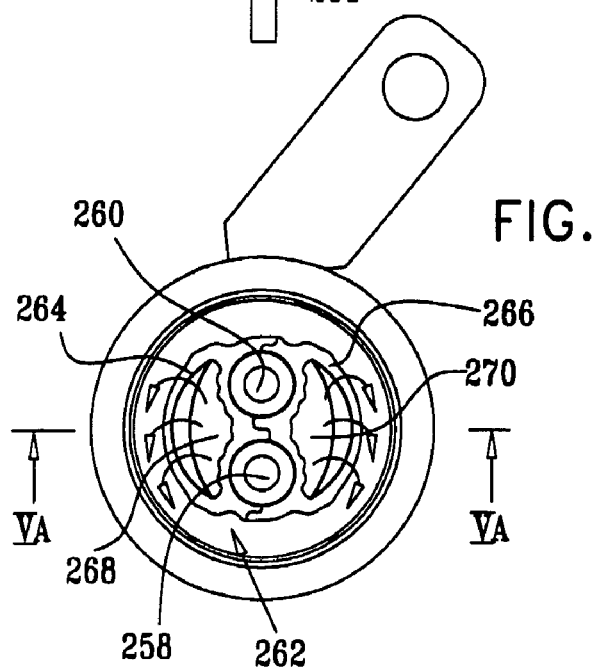

Reference is now made to FIGS. 5A and 5B, which are simplified sectional and top view illustrations of a liquid heating assembly suitable for use in the heated liquid discharge system of FIG. 1 in accordance with another preferred embodiment of the present invention.

As seen in FIG. 5A, a liquid heating assembly 250 preferably comprises a circular cylindrical outer sleeve 252 and a base 254, which defines a sealing ring retaining socket 256, arranged to retain an insulating liquid sealing ring (not shown). A plurality of heating elements, preferably two in number, designated by reference numerals 258 and 260, are located within sleeve 252.

In accordance with a preferred embodiment of the present invention, a heat dissipator assembly 262, including at least one heat dissipator, preferably encloses heating elements 258 and 260. Heat dissipator assembly 262 includes heat dissipators 264 and 266, defining respective liquid flow channels 268 and 270, which are thermally and mechanically connected to heating elements 258 and 260, preferably by soldering or any other suitable connection. Heat dissipator assembly 262 provides efficient heat transfer between heating elements 258 and 260 and liquid flowing through liquid flow channels 268 and 270. Heat dissipators 264 and 266 preferably include multiple side apertures, designated by reference numerals 271, 272 and 273, to facilitate passage of liquid therethrough.

It is appreciated that liquid flow channels 268 and 270 provide efficient heating of the liquid contained therein.

Outer sleeve 252 preferably includes multiple apertures, designated 274, 275 and 276, to enable liquid flow therethrough. It is appreciated that apertures 274, 275 and 276 may be provided in any suitable quantity, location and shape to facilitate passage of liquid through outer sleeve 252.

Liquid from the vehicle reservoir is supplied to liquid heating assembly 250 via a liquid inlet pathway portion (not shown) and a liquid inlet channel (not shown) and preferably enters liquid heating assembly 250, defined by sleeve 252, via apertures 274, 275 and 276 formed in sleeve 252.

The liquid is heated in liquid heating assembly 250 and the temperature of the liquid or the air overlying the liquid, depending on the liquid level, is sensed by a temperature sensor (not shown), preferably a sensor commercially available from EPCOS AG. Corporate Communications of Munich, Germany, identified by Catalog No. G560/50K/F2.

In accordance with a preferred embodiment of the present invention, heat dissipators 264 and 266 are positioned relative to heating elements 258 and 260 to define liquid flow channels 268 and 270. The heating elements 258 and 260 are preferably connected to the base 254, preferably by soldering.

Heat dissipators 264 and 266 are positioned within outer sleeve 252 to define a fluid flow gap between a lower surface 280 of the heat dissipator assembly 262 and an upper surface 281 of base 254. Additionally, walls of cylindrical outer sleeve 252 preferably extend beyond the top 282 of heat dissipators 264 and 266, defining a fluid flow gap between the top 282 of heat dissipator assembly 262 and an upper surface 283 of the cylindrical outer sleeve 252.

The fluid flow gaps described hereinabove, between lower surface 280 and upper surface 281, and between top 282 and upper surface 283, permit fluid flow in multiple directions within liquid heating assembly 250 as discussed hereinbelow.

As seen in FIG. 5A, heat dissipators 264 and 266 preferably extend along a longitudinal axis 286 and are non-uniform, with varying thickness, along longitudinal axis 286. Preferably, longitudinal axis 286 is intended to be aligned vertically within liquid heating assembly 250. Preferably, the thickness of heat dissipators 264 and 266 is greatest in locations nearest to base 254 and decreases along longitudinal axis 286 proportionally to the distance from base 254. It is appreciated that the provision of varying thickness provides a difference in heat transfer to fluid in regions located nearer to base 254 as compared with heat transfer to fluid in regions located more distant from base 254 and thus enhances homogeneity of liquid heating within liquid heating assembly 250.

It is appreciated that the fluid flows of the liquid heating assembly 250 of FIGS. 5A and 5B are similar to those described hereinabove with reference to FIGS. 4A and 4B.

Figure 6A:
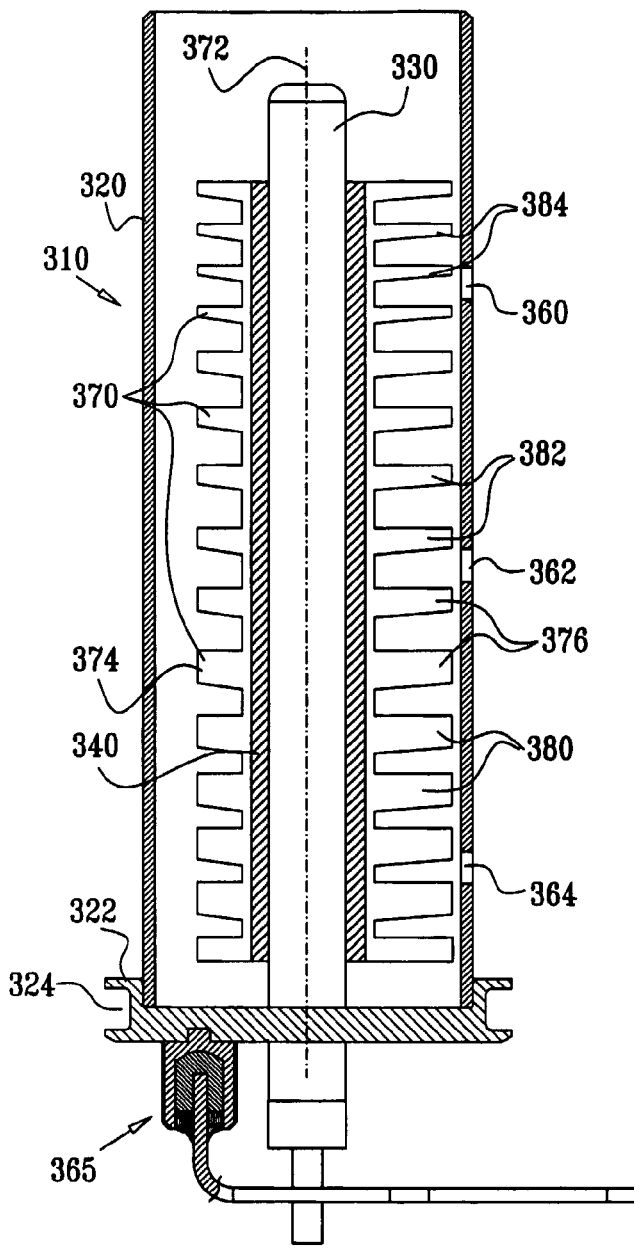
FIGS. 6A and 6B are, respectively, simplified sectional and top view illustrations of a liquid heating assembly suitable for use in the heated liquid discharge system of FIG. 1 in accordance with yet another preferred embodiment of the present invention.
Figure 6B:
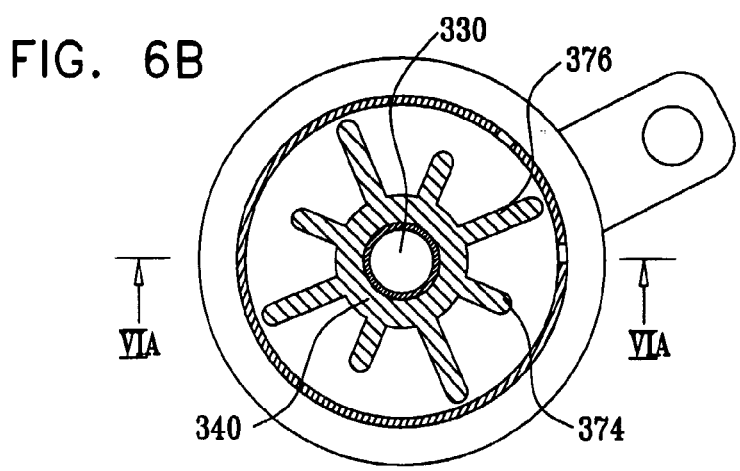

Reference is now made to FIGS. 6A and 6B, which are simplified sectional and top view illustrations of a liquid heating assembly suitable for use in the heated liquid discharge system of FIG. 1 in accordance with another preferred embodiment of the present invention.

As seen in FIG. 6A, a liquid heating assembly 310 preferably comprises a circular cylindrical outer sleeve 320 and a base 322, which defines a sealing ring retaining socket 324, arranged to retain an insulating liquid sealing ring (not shown). At least one heating element, designated by reference numeral 330, is located within sleeve 320.

In accordance with a preferred embodiment of the present invention, at least one heat dissipator 340 preferably encloses heating element 330. Heat dissipator 340 is preferably thermally and mechanically connected to heating element 330, preferably by soldering or any other suitable connection. Heat dissipator 340 provides for efficient heat transfer between heating element 330 and liquid flowing through liquid heating assembly 310.

Outer sleeve 320 preferably includes multiple apertures, designated 360, 362 and 364, to enable liquid flow therethrough. It is appreciated that apertures 360, 362 and 364 may be provided in any suitable quantity, location and shape to facilitate passage of liquid through outer sleeve 320.

Liquid heating assembly 310 preferably also includes an electrical power supply connection 365 to base 322.

Liquid from the vehicle reservoir is supplied to liquid heating assembly 310 via liquid inlet pathway portion (not shown) and liquid inlet channel (not shown) and preferably enters liquid heating assembly 310, defined by the interior of sleeve 320, via apertures 360, 362 and 364 formed in outer sleeve 320.

The liquid is heated in liquid heating assembly 310 and the temperature of the liquid or the air overlying the liquid, depending on the liquid level, is sensed by a temperature sensor (not shown), preferably a sensor commercially available from EPCOS AG. Corporate Communications of Munich, Germany, identified by Catalog No. G560/50K/F2.

As seen in FIG. 6A, heat dissipator 340 preferably comprises at least one plurality of fins 370 extending outwardly from heating element 330 along a longitudinal axis 372 defined by heating element 330. In accordance with a preferred embodiment of the present invention, fins 370 are non-uniform, preferably of varying length and thickness, as described hereinbelow, along longitudinal axis 372. Preferably, longitudinal axis 372 is intended to be aligned vertically within liquid heating assembly 310. In a preferred embodiment of the present invention the at least one plurality of fins includes a first plurality of fins 374 of a first length extending outwardly from heating element 330 and a second plurality of fins 376 of a second length extending outwardly from heating element 330, as seen in FIG. 6B.

As seen in FIG. 6A, preferably, the first plurality of fins 374 of a first length and the second plurality of fins 376 of as second length include a first group of fins 380 of a first surface area, a second group of fins 382 of a second surface area and a third group of fins 384 of a third surface area. Fins 380, which are located nearer to base 322 than fins 382 and fins 384, have a greater surface area than fins 382 and fins 384, to provide additional surface area in contact with fluid flowing through liquid heating assembly 310. Fins 382, which are located nearer to base 322 than fins 384, have a greater surface area than fins 384, to provide additional surface area in contact with fluid flowing through liquid heating assembly 310. It is appreciated that the provision of different groups of fins provides additional surface area in contact with fluid in regions located nearer to base 322 and enhances homogeneity of liquid heating within liquid heating assembly 310.

It is appreciated that, while the illustrated embodiment includes first, second and third groups of fins, groups of fins may be provided in any suitable configuration, including two groups or more than three groups, each including different surface areas.

It is appreciated that the increased turbulence caused by fluid impinging on fins 370 provides increased heat transfer and homogeneity in the temperature of fluid flowing through liquid heating assembly 310.

Figure 7A:
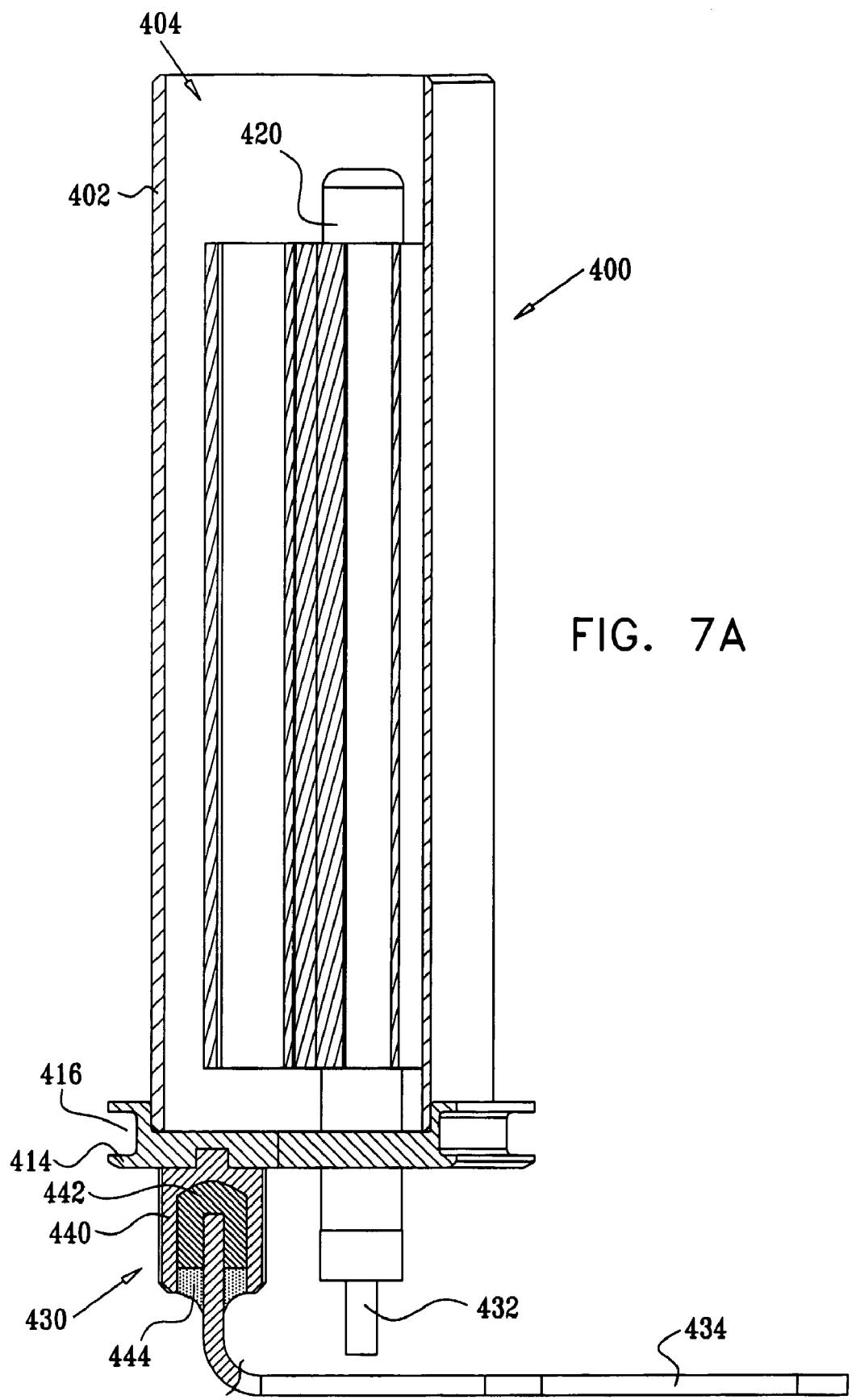
FIGS. 7A and 7B are simplified sectional illustrations of an electrical power supply connection to the heated liquid discharge system of FIG. 1 in accordance with yet another preferred embodiment of the present invention, prior to overheating and upon overheating, respectively.
Figure 7B:
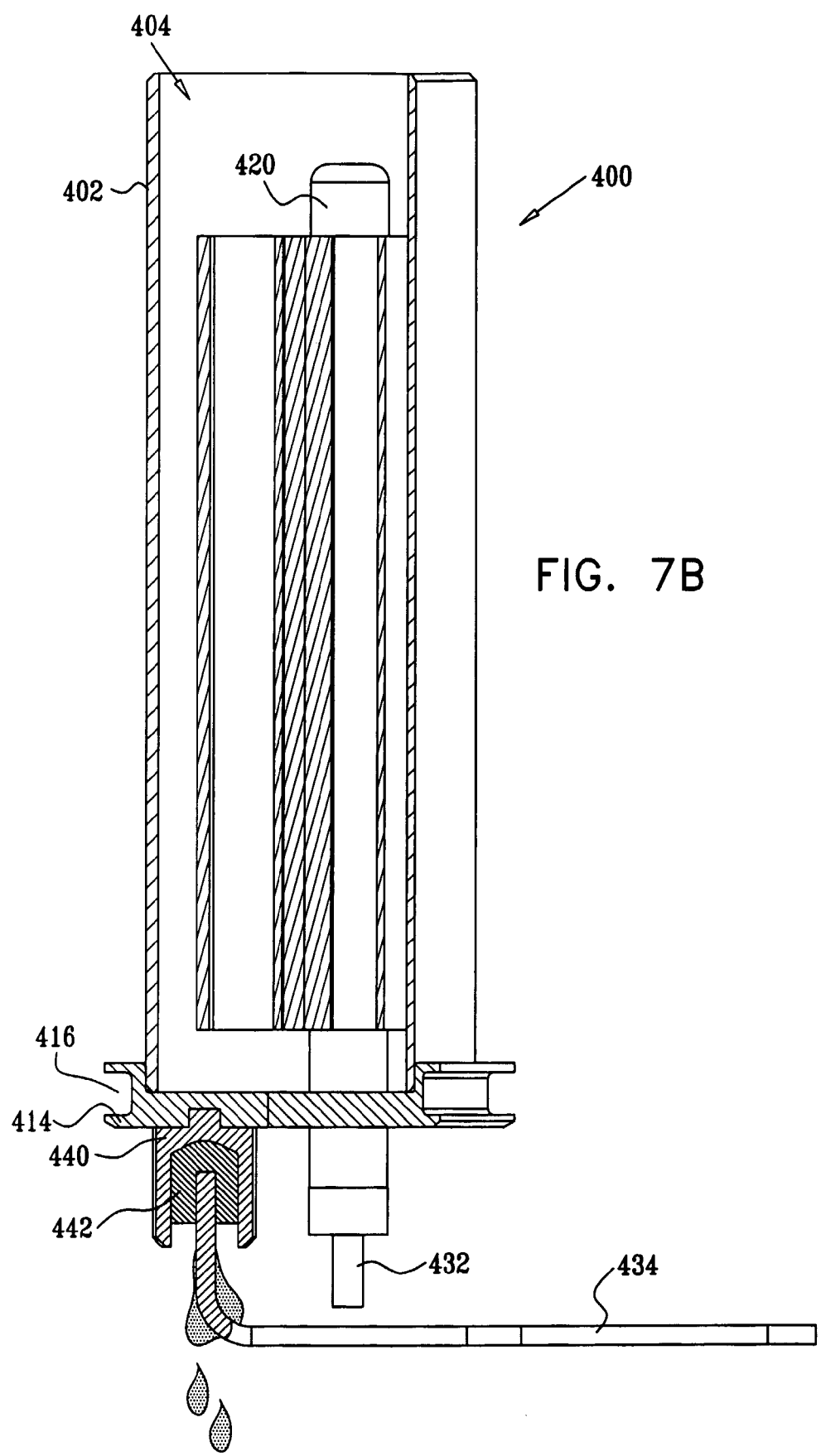

Reference is now made to FIGS. 7A and 7B, which are simplified sectional illustrations of an electrical power supply connection to the heated liquid discharge system of FIG. 1 in accordance with yet another preferred embodiment of the present invention, prior to overheating and upon overheating, respectively.

As seen in FIGS. 7A and 7B, a liquid heating assembly 400 preferably comprises a circular cylindrical outer sleeve 402, defining a liquid heating chamber 404. Sleeve 402 has a base 414, which defines a sealing ring retaining socket 416, arranged to retain an insulating liquid sealing ring (not shown). At least one heating element, designated by reference numeral 420, is located within sleeve 420. It is appreciated that even though only one heating element 420 is seen in the illustrated embodiment of FIGS. 7A and 7B, the electrical power supply connection of FIGS. 7A and 7B may be used with liquid heating assemblies including any suitable configuration of heating elements.

In accordance with a preferred embodiment of the present invention, liquid heating assembly 400 includes an electrical power supply connection 430, connected to base 414, preferably by soldering. Electrical power supply connection 430 forms part of a circuit providing current to heating element 420. An electric current input to heating element 420 is provided through an electrical connector point 432. From there the current flows, preferably through a first end of heating element 420, towards an opposite end of heating element 420 preferably connected to the metal body of heating element 420, and from there to the base 414. The current then flows through electrical power supply connection 430 to an electric contact 434.

Electrical power supply connection 430 preferably includes a housing 440, preferably a metal housing suitable for allowing electric current to flow through, an insulative layer 442, preferably a plastic layer, and a meltable conductor portion 444, preferably a solder portion, providing electrical connection between housing 440 and electric contact 434.

As described hereinabove, under normal operating conditions, electric current flows through electrical power supply connection 430 from housing 440, through meltable conductor portion 444 to electrical contact 434.

Electrical power supply connection 430 provides a mechanism for disconnecting the current flow to the heating element in the event of overheating within the liquid heating chamber 400, as described further hereinbelow.

Under normal operation, heating element 420 is activated only when liquid heating chamber 400 already contains a supply of liquid to be heated. In the event heating element 420 is activated with only a small quantity of liquid or no liquid in liquid heating chamber 404, liquid heating chamber 404 is likely to rapidly reach a high temperature and overheat. The rise in temperature within liquid heating chamber 404 and heating element 420 would cause heating of base 414 which in turn would lead to a rise in the temperature in housing 440.

When the temperature in housing 440 exceeds the melting temperature of the meltable conductor portion 444 of electrical power supply connection 430, the meltable conductor portion 444 melts and drips out of housing 440, as seen in FIG. 7B. The melting of meltable conductor portion 444 breaks the electrical circuit between housing 440 and the electrical contact 434 and interrupts supply of electrical power to the heating element 420.

Electrical power supply connection 430 thus provides a one-time current flow termination and provides protection against damage to the vehicle resulting from overheating of the liquid heating chamber 404 caused by a heating system malfunction.

Figure 8:
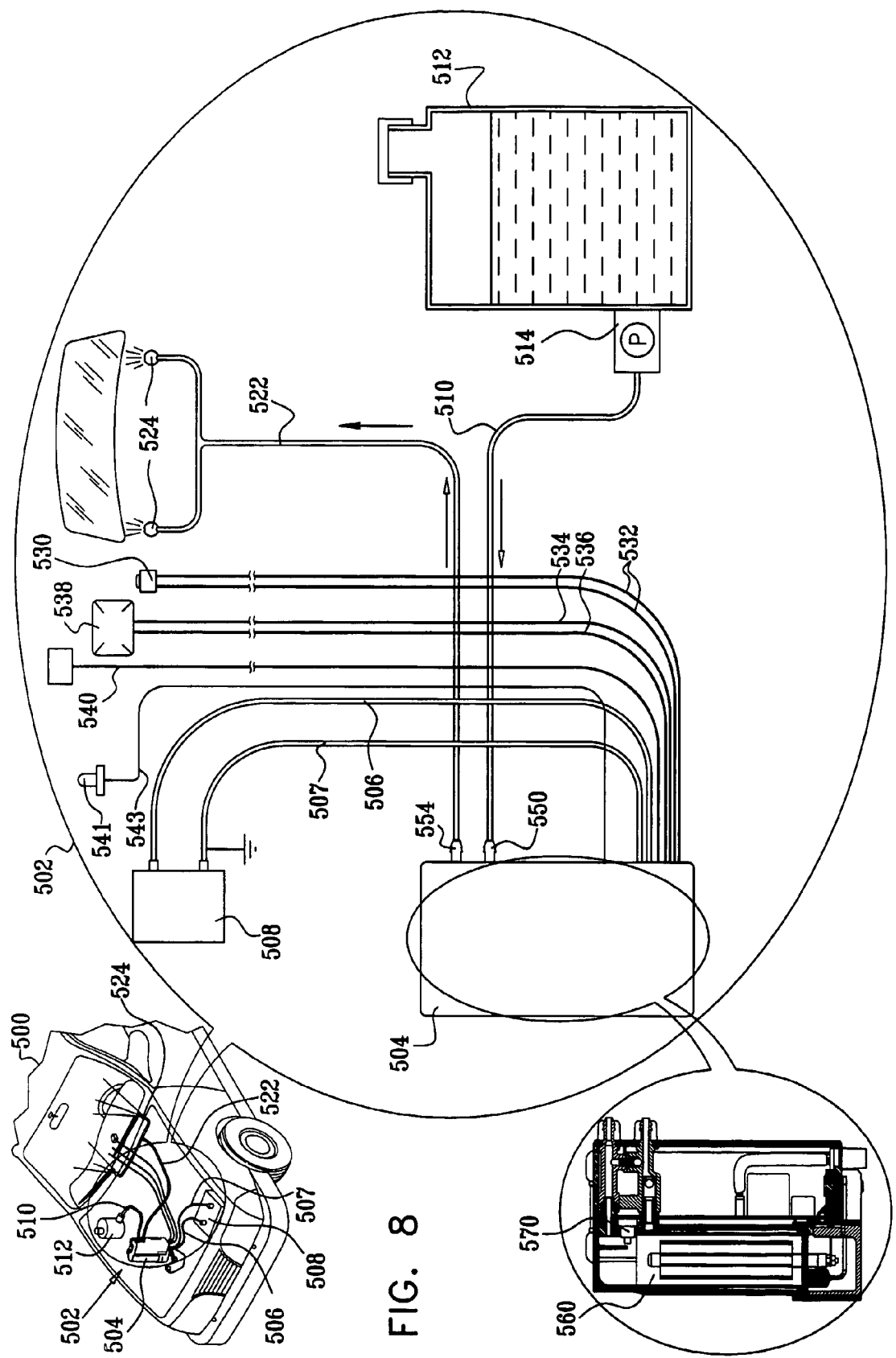
FIG. 8 is a simplified illustration of a heated liquid discharge system mounted in a motor vehicle, constructed and operative in accordance with another preferred embodiment of the present invention.
Figure 9:
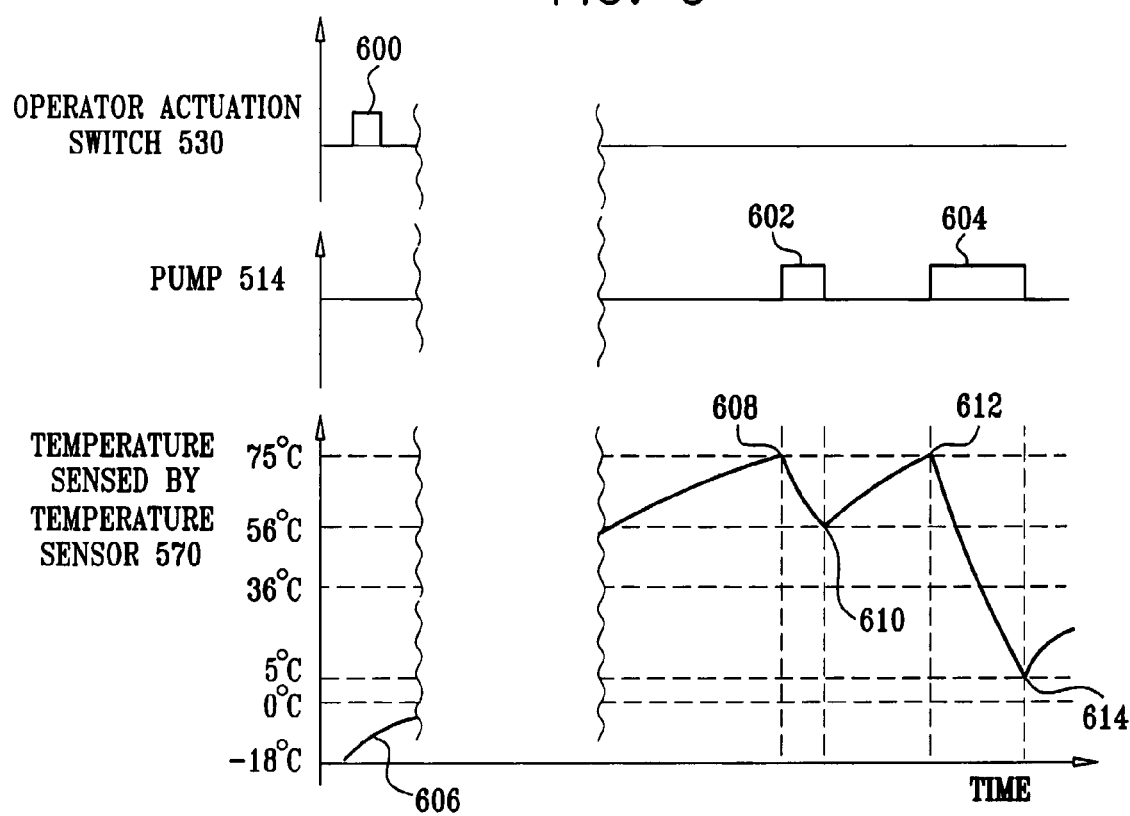
FIG. 9 is a simplified timing diagram illustrating the operation of the system of FIG. 8.

Reference is now made to FIG. 8, which is a simplified illustration of a heated liquid discharge system constructed and operative in accordance with another preferred embodiment of the present invention mounted in a motor vehicle, and to FIG. 9, which is a simplified timing diagram illustrating the operation of the system of FIG. 8, in accordance with a preferred embodiment of the present invention.

As seen in FIG. 8, an otherwise conventional motor vehicle 500 is seen to incorporate a heated liquid discharge system 502 constructed and operative in accordance with a preferred embodiment of the present invention. The heated liquid discharge system preferably includes a main assembly 504, which provides liquid heating as well as electrical and liquid flow control functionalities. Main assembly 504 is electrically connected via electrical cables 506 and 507 to a vehicle battery 508.

A liquid inflow conduit 510 supplies liquid, such as water, antifreeze or windshield cleaning liquid, from a vehicle liquid reservoir 512, having an associated vehicle pump 514, to main assembly 504. A liquid outflow conduit 522 supplies liquid to one or more sprayers 524, which may be located at one or more of the following vehicle locations: front vehicle windshield, back vehicle windshield, side vehicle windows in general and especially in locations providing viewing access to vehicle exterior mirrors, vehicle headlights, vehicle rear lights and vehicle exterior mirrors.

A vehicle operator actuation switch 530, typically located on the vehicle dashboard, is electrically coupled to main assembly 504 by a control conductor pair 532. A pair of vehicle computer interface conductors 534 and 536 interconnect the main assembly 504 to the existing vehicle computer 538. An ignition interface conductor 540 interconnects the main assembly 504 to the existing vehicle ignition switch. An external temperature sensor 541 is connected to main assembly 504 via conductor 543.

The vehicle operator actuation switch 530 preferably provides a user input for actuating automatic sprinkling cycles described hereinbelow.

Liquid from reservoir 512 is supplied by vehicle pump 514 to main assembly 504 via liquid inlet conduit 510 and a liquid inlet pathway portion 550. Liquid is supplied to sprayers 524 via a liquid outlet pathway portion 554 and liquid outflow conduit 522.

Main assembly 504 preferably includes a liquid heating chamber 560 in communication with a temperature sensor 570, preferably a sensor commercially available from EPCOS AG. Corporate Communications of Munich, Germany, identified by Catalog No. G560/50K/F2, and control circuitry for operation of the main assembly 504 which is connected inter alia to temperature sensor 570 and the vehicle battery.

As seen in FIG. 9, system actuation is preferably initiated by a user, such as a driver of a motor vehicle, depressing actuation switch 530, typically located on the vehicle dashboard, as designated by reference numeral 600. This actuation places the system into an automatic activation mode. The system is operative, in this mode, to operate pump 514 to execute a first spray cycle and a second spray cycle, designated by reference numerals 602 and 604, respectively.

Upon entering automatic activation mode, heated liquid discharge system 502 is operative to provide a current to heating elements, heating the liquid contained in liquid heating chamber 560, causing an increase in the temperature sensed by sensor 570, as designated by reference numeral 606.

When the temperature sensed by temperature sensor 570 reaches a first spray cycle start temperature, 75° C. in the illustrated example, as designated by reference numeral 608, heated liquid discharge system 502 preferably operates pump 514 to execute first spray cycle 602 and discharge fluid through liquid outlet pathway portion 554 and liquid outflow conduit 522 to sprayers 524. First spray cycle 602 preferably continues until the temperature sensed by sensor 570 reaches a first spray cycle end temperature, lower than the first spray cycle start temperature, 56° C. in the illustrated example, as designated by reference numeral 610. In accordance with a preferred embodiment of the present invention, first spray cycle start temperature and first spray cycle end temperature are selected such that the duration of first spray cycle 602 is preferably approximately four seconds, during which time the temperature sensed by sensor 570 reaches the first spray cycle end temperature.

Upon termination of the first spray cycle 602, the temperature sensed by sensor 570 starts to rise again due to the heating of the fluid contained in the liquid heating chamber 560.

In accordance with a preferred embodiment of the present invention, heated liquid discharge system 502 is preferably operative to operate pump 514 to execute second spray cycle 604 when the temperature sensed by sensor 570 reaches a second spray cycle start temperature, 75° C. in the illustrated example, as designated by reference numeral 612. It is appreciated that second spray cycle start temperature may be the same as the first spray cycle start temperature or may be different.

Second spray cycle 604 preferably continues until the temperature sensed by sensor 570 reaches a second spray cycle end temperature, lower than the first spray cycle end temperature and lower than the second spray cycle start temperature, such as 5° C. in the illustrated example, as designated by reference numeral 614. In accordance with a preferred embodiment of the present invention, second spray cycle start temperature and second spray cycle end temperature are selected such that the duration of second spray cycle 604 preferably does not exceed eight seconds, during which time the temperature sensed by sensor 570 reaches the second spray cycle end temperature.

It is appreciated that heated liquid discharge system 502 may also be operative to end first spray cycle 602 based on a first spray cycle maximum duration, in the event that the first spray cycle end temperature is not reached within the maximum time duration. It is also appreciated that heated liquid discharge system 502 may also be operative to end second spray cycle 604 based on a second spray cycle maximum duration, in the event that the second spray cycle end temperature is not reached within the maximum time duration.

It is appreciated that the temperatures given are for illustrative purposes only, and that any suitable temperature ranges may be selected to determine the duration of the first and second spray cycles. It is appreciated that the time durations given are for illustrative purposes only, and that any duration may be selected as the maximum time allowed for the first and second spraying cycles 602 and 604.

In accordance with another preferred embodiment of the present invention, heated liquid discharge system 502 may be operative to determine the second spray cycle end temperature as a function of an ambient temperature sensed by temperature sensor 541. It is appreciated that determining the second spray cycle end temperature as a function of the ambient temperature provides an enhanced second spray cycle, particularly at very low ambient temperatures, such as below 0° C.

Figure 10A:
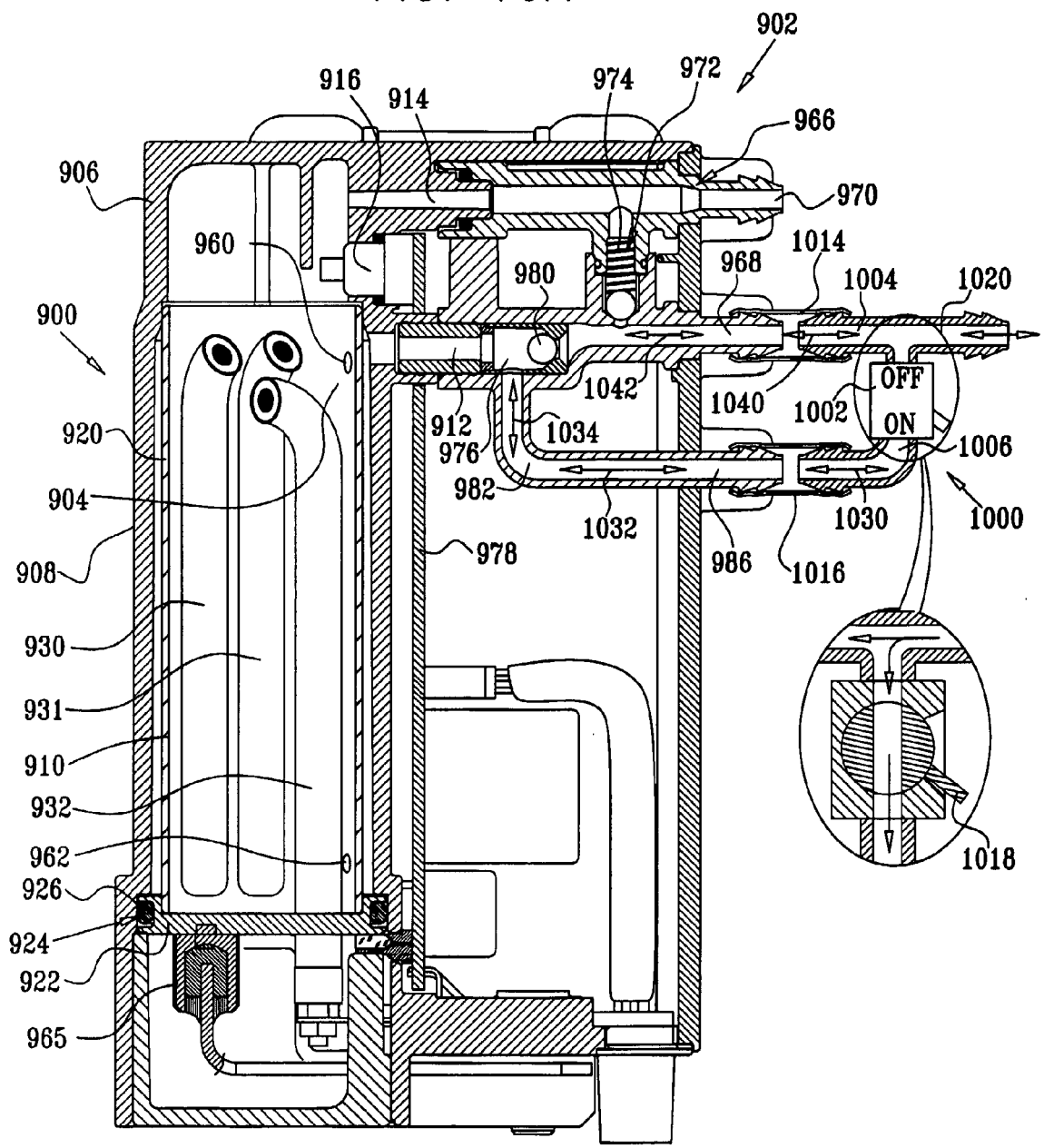
FIGS. 10A and 10B are simplified sectional illustrations of a heated liquid discharge system suitable for use in a motor vehicle, constructed and operative in accordance with yet another preferred embodiment of the present invention, in two different operating modes.
Figure 10B:
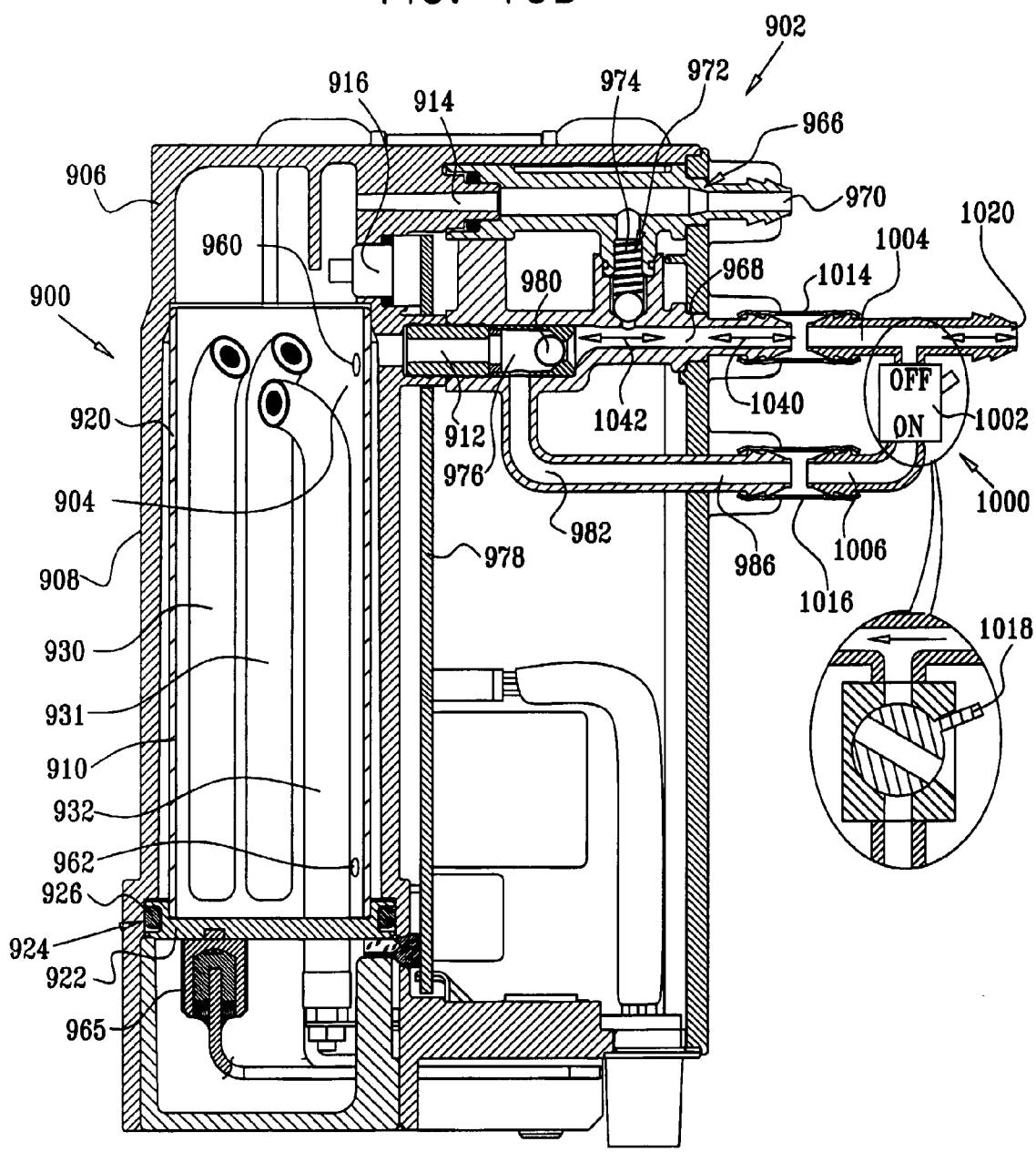

Reference is now made to FIGS. 10A and 10B, which are simplified sectional illustrations of a heated liquid discharge system suitable for use in a motor vehicle, constructed and operative in accordance with yet another preferred embodiment of the present invention, in two different operating modes.

As seen in FIGS. 10A and 10B, a heated liquid discharge system 900, similar to heated liquid discharge system 100 of FIG. 1, preferably includes a main assembly 902, which provides liquid heating and includes electrical and liquid flow control functionalities. Main assembly 902 is preferably electrically connected via electrical cables (not shown) to a vehicle battery (not shown).

Main assembly 902 comprises a liquid heating chamber 904 communicating with a liquid inflow conduit (not shown) and a liquid outflow conduit (not shown). The liquid inflow conduit is operative to supply liquid, such as water, antifreeze or windshield cleaning liquid, from a vehicle liquid reservoir (not shown), having an associated vehicle pump (not shown), to the liquid heating chamber 904. The liquid outflow conduit is operative to supply liquid to one or more sprayers (not shown), which may be located at one or more of the following vehicle locations: front vehicle windshield, back vehicle windshield, side vehicle windows in general and especially in locations providing viewing access to vehicle exterior mirrors, vehicle headlights, vehicle rear lights and vehicle exterior mirrors.

Main assembly 902 preferably includes a housing 906 defining a generally circular cylindrical liquid heating chamber accommodating volume 908, in which is located liquid heating chamber 904, in a major portion of which is disposed a liquid heating assembly 910. Housing 906 also preferably defines a liquid inlet channel 912, a liquid outlet channel 914 and an aperture for housing a heated liquid temperature sensor 916, all communicating with liquid heating chamber accommodating volume 908.

Liquid heating assembly 910 preferably comprises a circular cylindrical outer sleeve 920, which defines liquid heating chamber 904, and a base 922, which defines a sealing ring retaining socket 924, arranged to retain an insulating liquid sealing ring 926. A plurality of heating elements, three in the illustrated embodiment, designated by reference numerals 930, 931 and 932, are located within sleeve 920. It is appreciated that while the illustrated embodiment includes three heating elements, any suitable configuration of heating elements may be provided.

Outer sleeve 920 preferably includes multiple apertures, designated 960 and 962, to enable liquid flow therethrough. It is appreciated that apertures 960 and 962 may be provided in any suitable quantity, location and shape to facilitate passage of liquid through outer sleeve 920 into liquid heating assembly 910.

Liquid heating assembly 910 may also include an electrical power supply connection 965 electrically connected to base 922.

As seen further in FIGS. 10A and 10B, heated liquid discharge system 900 also includes a liquid connector assembly 966 including a liquid inlet pathway portion 968 and a liquid outlet pathway portion 970. Liquid connector assembly 966 preferably comprises an injection molded element which also defines a differential pressure bypass pathway portion 972, which is controlled by a spring loaded one-way valve 974 and which permits liquid flow from liquid inlet pathway portion 968 to liquid outlet pathway portion 970 when the pressure differential thereacross reaches a predetermined threshold, typically 0.3-0.5 bar, which indicates the existence of a blockage in the liquid path through liquid heating chamber 904.

A valve 976 is disposed in liquid inlet pathway portion 968 upstream of liquid heating chamber 904.

Liquid from the vehicle reservoir is supplied to liquid heating chamber accommodating volume 908 via liquid inlet pathway portion 968 and liquid inlet channel 912 and preferably enters liquid heating chamber 904, defined by sleeve 920, via apertures 960 and 962 formed in sleeve 920.

The liquid is heated in liquid heating chamber 904 and the temperature of the liquid or the air overlying the liquid, depending on the liquid level, is sensed by temperature sensor 916, preferably a sensor commercially available from EPCOS AG. Corporate Communications of Munich, Germany, identified by Catalog No. G560/50K/F2. Temperature sensor 916 preferably is mounted onto a printed circuit board 978 which is mounted within housing 906 and located outside of liquid heating chamber accommodating volume 908.

Mounted on printed circuit board 978 is control circuitry for operation of the main assembly 902 which is connected inter alia to temperature sensor 916 and the vehicle battery.

It is appreciated that valve 976 is similar in structure to valve 176 of FIG. 1, including a ball 980, except that valve 976 communicates with a conduit 982 which provides an alternative flow pathway between the sprayers and the reservoir. Heated liquid discharge system 900 thus provides two fluid flow passages for draining fluid from the sprayers to the reservoir upon the conclusion of spraying. As seen in FIG. 10A, an end 986 of conduit 982 extends beyond an outside surface of housing 906.

A bi-directional valve assembly 1000 is connected to liquid inlet pathway portion 968 and conduit 982. Bi-directional valve assembly 1000 includes a bi-directional valve 1002 and conduits 1004 and 1006 and respective couplings 1014 and 1016 which link valve 1002 with liquid inlet pathway portion 968 and end 986 of conduit 982 respectively.

Bi-directional valve 1002 preferably comprises a user positionable valve member 1018. Bi-directional valve assembly 1000 further includes an inlet conduit 1020 for connecting heated liquid discharge system 900 to the vehicle reservoir (not shown).

In the operating orientation shown in FIG. 10A, valve member 1018 of bi-directional valve 1002 is located in the 'ON' position which permits flow into liquid heating chamber 904 bypassing ball 980 of valve 976, as indicated by flows, designated by arrows 1030, 1032 and 1034, in addition to flow through ball 980 of valve 976 as indicated by flows, designated by arrows 1040 and 1042. In the operating orientation of FIG. 10A, heated liquid discharge system 900 supplies liquid under pressure to the liquid heating chamber 904 and allows backflow, as indicated by arrows 1030, 1032 and 1034, at a relatively fast rate.

In the operating orientation shown in FIG. 10B, valve member 1018 of bi-directional valve 1002 is located in the "OFF" position which permits flow into liquid heating chamber 904 through ball 980 of valve 976, as indicated by arrows 1040 and 1042. In the operating orientation of FIG. 10B, valve 976 is functionally equivalent to valve 176 of FIG. 1 and allows backflow, as indicated by arrows 1040 and 1042, at a relatively slow rate.

Heated liquid discharge system 900 thus provides user selectable backflow functionality without requiring valve 976 to be directly accessed after installation in a vehicle.

It is appreciated that bi-directional valve assembly 1000 may be obviated and a cap (not shown) placed over end 986 of conduit 982. In this orientation heated liquid discharge system 900 allows supply of liquid under pressure to the liquid heating chamber 904 but impedes backflow therethrough, restricting backflow to a relatively slow rate.

It is appreciated that the systems of the present invention are suitable for inclusion both in new vehicles and for retrofitting into existing vehicles.

It will be appreciated by persons skilled in the art that the present invention is not limited to what has been particularly shown and described hereinabove. Rather the scope of the present invention includes both combinations and subcombinations of the various features described hereinabove as well as modifications and variations thereof as would occur to a person of skill in the art upon reading the foregoing specification and which are not in the prior art.

The invention claimed is:

1. A windshield heated liquid spray assembly comprising:
   a liquid heating assembly; and
   a heated liquid spray assembly operative to spray heated liquid onto a windshield,
   said liquid heating assembly comprising:
   a liquid heating chamber comprising a substantially cylindrical outer sleeve disposed about a longitudinal axis;

at least one heating element disposed in said liquid heating chamber; and at least one heat dissipator disposed in said liquid heating chamber in heat conduction contact with said at least one heating element, said at least one heat dissipator having at least one wall at least partially defining at least one substantially linear liquid flow channel parallel to said longitudinal axis and having first and second open ends, said at least one heat dissipator being operative to transfer heat from said at least one heating element to liquid flowing through said at least one liquid flow channel, whereby liquid flows within the at least one liquid flow channel primarily in one direction with respect to the longitudinal axis, from the liquid heating chamber into the first open end to the second open end and into the liquid heating chamber, through convection as heat is transferred to the liquid by the at least one heat dissipator.

2. A windshield heated liquid spray assembly according to claim 1 and also comprising a liquid temperature sensor operative to sense a temperature of liquid heated by said liquid heating assembly and wherein said at least one heat dissipator is configured and operative to enhance homogeneity of heating of said liquid in said liquid heating chamber, whereby said temperature sensed by said liquid temperature sensor is generally representative of the temperature of said liquid within said liquid heating chamber.

3. A windshield heated liquid spray assembly according to claim 1 and wherein the at least one wall of said at least one heat dissipator is configured to be non-uniform in thickness along said longitudinal axis of said liquid heating chamber.

4. A windshield heated liquid spray assembly according to claim 1 and wherein said at least one heat dissipator includes at least one aperture through the at least one wall communicating with said at least one liquid flow channel.

5. A windshield heated liquid spray assembly according to claim 1 and wherein the liquid heating chamber further comprises a base connected to a first end of the cylindrical outer sleeve and an upper surface connected to a second end of the cylindrical outer sleeve.

6. A windshield heated liquid spray assembly according to claim 5 and wherein a first fluid flow gap is formed between the first open end of the at least one heat dissipator and the liquid heating chamber base, and a second fluid flow gap is formed between the second open end of the at least one heat dissipator and the liquid heating chamber upper surface, whereby heated liquid circulates by convection primarily out the second open end into the second fluid flow gap, between the at least one heat dissipator and the liquid heating chamber cylindrical sleeve, and through the first fluid flow gap into the first open end.

* * * * *